United States Patent Office 3,275,934
Patented Sept. 27, 1966

3,275,934
APPARATUS FOR MEASURING THE OUTPUT VOLTAGE OF AN ALTERNATING CURRENT BRIDGE BY COMPARISON WITH THE OUTPUT OF A VARIABLE TRANSFORMER
Frederick Herbert Laishley, Solihull, England, assignor to Joseph Lucas (Industries) Limited, Birmingham, England
Filed Feb. 15, 1963, Ser. No. 258,748
Claims priority, application Great Britain, Feb. 28, 1962, 7,766/62
1 Claim. (Cl. 324—99)

This invention relates to an apparatus for measuring the output voltage of an alternating current bridge. The invention is particularly designed for use in weighing apparatus where the output voltage of a bridge is dependent on the load applied thereto, but it is equally applicable in any instance where the output voltage of a bridge varies in accordance with some physical quantity which it is desired to measure.

Apparatus in accordance with the invention comprises in combination a transformer the primary winding of which is connected in use to an A.C. voltage in phase with that supplied to the bridge, a difference amplifier connected to the bridge and to the secondary of the transformer so as to receive the output voltage of the bridge and a proportion of the output voltage of the transformer, the difference amplifier producing an A.C. output the phase of which is dependent on which of the voltages applied to the difference amplifier is greater in amplitude, a phase detector connected to the amplifier so as to produce a direct current output of polarity dependent upon the phase of the output from the amplifier, means operable by the output from the phase detector for varying said proportion until the voltages applied to the amplifier are equal, and means for indicating said proportion.

Preferably, the same A.C. supply is used for the bridge and the transformer, thereby ensuring that the supplies are in phase.

Figure 1:
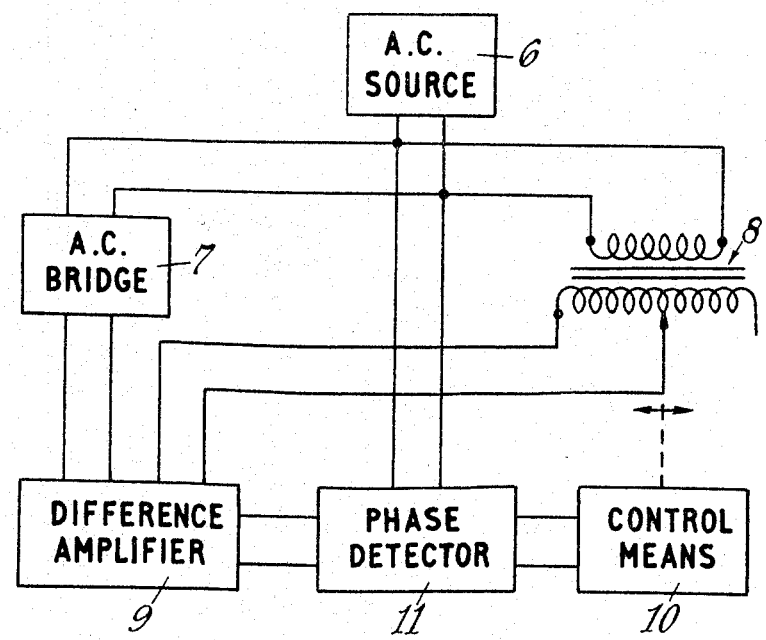
Figure 2:
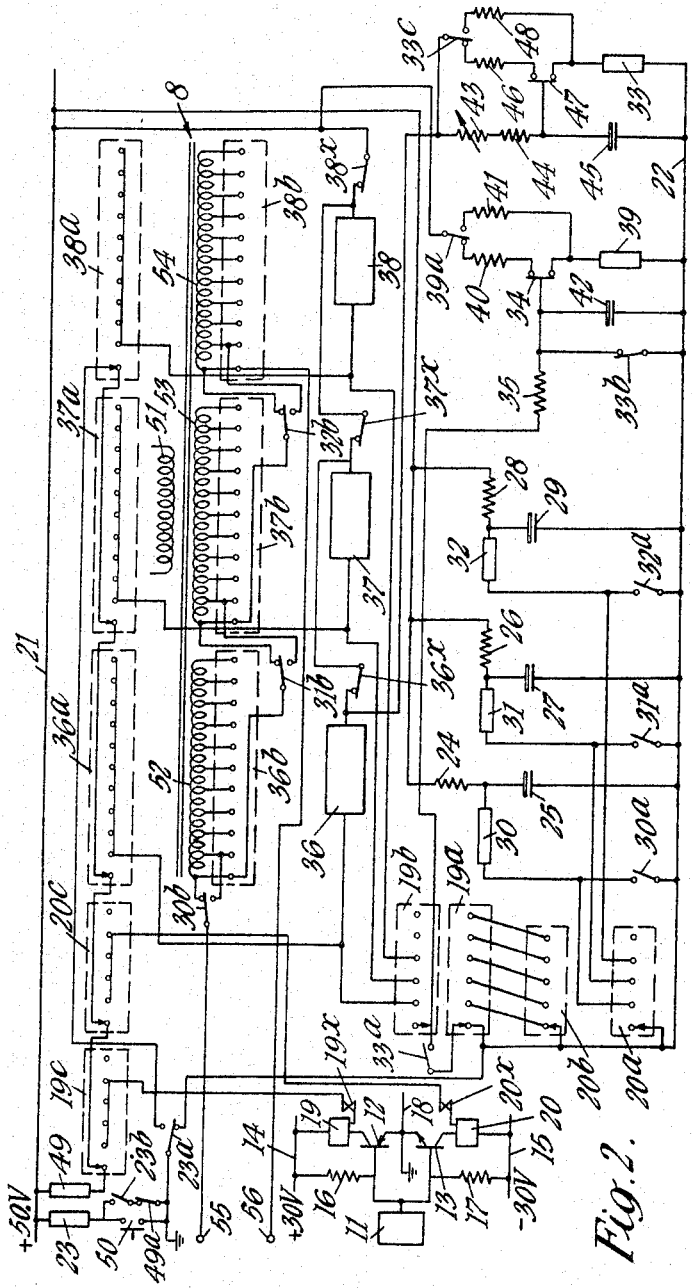

In the accompanying drawings, FIGURE 1 is a block diagram illustrating one example of the invention, as applied to weighing apparatus, and FIGURE 2 is a circuit diagram corresponding to part of FIGURE 1.

Referring to FIGURE 1, there is provided an A.C. bridge 7 connected to an A.C. source 6 and having in one pair of opposite arms strain gauges, so that the output voltage of the bridge 7 is dependent on the load applied thereto. There is further provided a transformer 8, the primary winding of which is connected to the A.C. source. A variable proportion of the output from the secondary of the transformer 8 is applied to a difference amplifier 9 of any convenient known form, which also receives the output from the bridge 7. The inputs to the amplifier have the same phase and so the output from the amplifier 9 represents the difference between the two inputs thereto. Moreover, since the amplifier always substracts the two signals in the same order, the phase of the output will depend upon which of the input signals is larger. For convenience, the phase will be designated positive or negative when the signal from the bridge 7 is the larger or the smaller respectively.

The output from the amplifier is fed to a phase detector 11 to which is also supplied a reference signal from the A.C. source. The detector produces a direct current output of one polarity if the input and reference signals are in phase, and of the opposite polarity if they are out of phase.

The output from the detector serves to operate control means 10 for varying the proportion of the output from the secondary of the transformer which is applied to the amplifier, the proportion being increased or decreased in accordance with the polarity of the direct current. The operation continues until the signals applied to the amplifier are equal. At this point the proportion of the output of each of the three secondary windings which is applied to the amplifier gives an indication of the load applied to the load cells. Any convenient means is provided for giving a visual indication or for recording the load.

It will be appreciated that reference to the output from the difference amplifier being zero when the inputs thereto are equal are intended to include cases where the difference between the signals applied to the amplifier is less than the smallest digit measurable by the transformer, the effective output from the amplifier being zero in this case.

The control means 10 is illustrated in greater detail in FIGURE 2, which also shows the detector 11 and transformer 8. The output from the detector 11 is fed to the bases of a p-n-p transistor 12 and an n-p-n transistor 13. The transistors 12, 13 have their bases connected to +30 and —30 volt supply lines 14, 15 through resistors 16 17 respectively, their emitters connected to an earthed line 18, and their collectors connected to an earthed line 18, and their collectors connected to the lines 14, 15 respectively through uniselectors 19, 20. The uniselector is a known electrical switching device having a contact arm which in use moves step by step over a plurality of contact pieces. The particular uniselectors 19, 20 shown each have three banks of contact pieces, designated with suffixes $a$, $b$ and $c$ and three corresponding contact arms which move together step by step over the three banks of contact pieces respectively. Moreover, all the uniselectors in this example are of the kind which are stepped upon deenergisation, and have associated therewith normally closed contacts designated with the suffix $x$, these contacts being opened momentarily upon stepping of the associated uniselector.

The apparatus further includes a line 21 adapted for connection to a +50 volt supply, and a line 22 adapted for connection to earth when a relay contact $23^a$ is in the position shown. Connected between the lines 21, 22 are three parallel circuits containing respectively a resistor 24 and a capacitor 25, a resistor 26 and a capacitor 27, and a resistor 28 and a capacitor 29. Points intermediate these resistors and capacitors respectively are connected to the line 22 through relays 30, 31, 32 having normally open contacts $30^a$, $31^a$, $32^a$ in series therewith, whilst points intermediate the relays 30, 31, 32 and their contacts are connected respectively to the first, second and third contact pieces of the uniselector bank $20^a$. The movable contact piece of the bank $20^a$ is connected to the line 22, as are the movable contact piece of a bank $20^b$ and the zero contact piece of a bank $19^a$.

The zero, first, second, third and fourth contact pieces of the bank $20^b$ are connected respectively to the first, second, third, fourth and fifth contact pieces of the bank $19^a$, the movable contact piece of which is connected through a normally open relay contact $33^a$ to the movable contact piece of a bank $19^b$, this movable contact piece being further connected to the emitter of a uni-junction transistor 34, through a resistor 35.

The first, second and third contact pieces of the bank $19^b$ are connected to the inputs of uniselectors 36, 37, 38 respectively. The output from the uniselector 36 is connected through contacts $36^x$ to the output from the uniselectors 37, which in turn is connected through contacts $37^x$ to the output from the uniselector 38. The latter has its output connected through contacts $38^x$ to the line 21 and also to a movable relay contact $39^a$. The contact $39^a$ normally occupies the position shown, in which it is connected through a resistor 40 to the primary base of transistor 34, but is movable to an alternative position in which it is connected through a resistor 41 to the secondary base of the transistor 34. The secondary base is connected to the line 22 through the relay 39, whilst the emitter of the transistor 34 is connected to the line 22 through a capacitor 42 and a normally closed relay contact 33ᵇ in parallel.

A point intermediate the uniselector 36 and contacts 36ˣ is connected to the line 22 thruogh a variable resistor 43, a resistor 44 and a capacitor 45 in series, and is further connected to a movable contact 33ᶜ which is normally connected through a resistor 46 to the primary base of a uni-junction transistor 47. In its alternative position, the contact 33ᶜ is connected to the secondary base through resistor 48. The secondary base is connected to the line 22 through the relay 33, whilst the emitter is connected to a point intermediate the resistor 44 and capacitor 45.

The uniselectors 36, 37, 38 include banks 36ᵃ, 37ᵃ and 38ᵃ having all their fixed contact pieces apart from the zero contact pieces connected respectively to the first, second and third contact pieces of the bank 19ᵇ. The movable contact pieces of the banks 36ᵃ, 37ᵃ are connected to the zero contact pieces of the banks 37ᵃ, 38ᵃ respectively, whilst the movable contact piece of the bank 38ᵃ is connected to a terminal associated with the contact 23ᵃ is in its alternative position. The zero contact piece of the bank 36ᵃ is connected to the movable contact piece of a bank 20ᶜ having its zero contact piece connected to the movable contact piece of a bank 19ᶜ, and its remaining contact pieces connected through contact 20ˣ to the uniselector 20, the zero contact piece of the bank 19ᶜ is connected to the line 21 through a relay 49, whilst its remaining contact pieces are connected to the uniselector 19 through the contacts 19ˣ.

The contact 23ᵃ is connected to the line 21 through a series circuit including a normally closed contact 49ᵃ, a normally open contact 23ᵇ and the relay 23, the contacts 49ᵃ, 23ᵇ being bridged by a normally open switch 50.

The primary winding of the transformer 8 is indicated at 51, and the three secondary windings at 52, 53 and 54. The windings 52, 53, 54 are unequal and may, for example, constitute one hundred parts, ten parts, and one part of the secondary output respectively. Moreover, each winding is itself divided into ten parts. The windings 52, 53, 54 have associated therewith uniselector banks 36ᵇ, 37ᵇ, and 38ᵇ respectively, whilst the output to the amplifier 9 is taken from terminals 55, 56 connected respectively to a movable contact 30ᵇ of the relay 30, and to the movable contact piece of the bank 38ᵇ. The movable contact pieces of the banks 36ᵇ, 37ᵇ are connected resepectively to further contacts 31ᵇ, 32ᵇ. The contacts 30ᵇ, 31ᵇ, 32ᵇ can be moved to positions in which they communicate with the zero contact pieces on the banks 36ᵇ, 37ᵇ, 38ᵇ respectively, but normally they occupy the positions shown in which they communicate with additional contact pieces on the banks respectively.

In operation, the bridge is balanced when no load is applied thereto, and the transformer output is also zero. All the uniselectors are therefore re-set, but the uniselectors 19, 20 are energised through their respective transistors 12, 13.

If a load is now applied to the bridge, the output from the latter will be fed through the amplifier to the phase detector, which produces a positive output and thereby switches off the transistor 12 and de-energises the uniselector 19 so that the movable contacts of its three banks step from the zero contact pieces to the first contact pieces.

The capacitor 45 is charged by way of contacts 38ˣ, 37ˣ, 36ˣ and resistors 43, 44. When the voltage across the capacitor 45 reaches a predetermined value, the transistor 47 breaks down to energise the relay 33, which is then held on through the contact 33ᶜ. Energisation of the relay 33 takes place as soon as the apparatus is connected to a source of power.

The uniselector 36 is now energised, since it is connected to the line 21 through contacts 36ˣ, 37ˣ, 38ˣ, and to the line 22 through the movable contact piece of the bank 19ᵇ, the contact 33ᵃ, and movable contact pieces of the banks 19ᵃ, 20ᵇ. The contacts 36ˣ, now open momentarily to de-energise the relay 33. Moreover, the banks of uniselector 36 are stepped once so that one tenth of the output voltage of the winding 52 is applied to the terminals 55, 56.

The capacitor 45 now re-charges and as before the relay 33 is energised. Provided that the output voltage of the bridge is still greater than that applied to the terminals 55, 56, the above-described cycle is repeated. However, eventually a stage will be reached at which the uniselector 36 has been stepped to a position such that the output voltage at the terminals 55, 56 exceeds that of the bridge. At this point, the supply from the detector 11 will be negative, so that the uniselector 19 is re-energised (no stepping occurring upon re-energisation), and the uniselector 20 is stepped once. The circuit to the uniselector 36ᵇ is now broken, but a circuit is completed through the bank 20ᵃ to energise the relay 30, which is thereafter held on through the contact 30ᵃ.

Energisation of the raly 30 moves the contact 30ᵇ to its alternative position, thereby effectively by-passing one section of the winding 36ᵇ. The output from the terminals 55, 56 is thus reduced to a value below that of the bridge, so that the uniselector 20 is energised and the uniselector 19 is de-energised and therefore stepped. Stepping of the uniselector 19 serves to complete a circuit through the contact 33ᵃ to energise the uniselector 37.

The cycle of operations is now precisely similar to that described above. The uniselector 37 is stepped until the voltage at the terminals 55, 56 exceeds that of the bridge. The circuit to the uniselector 37 is then broken by stepping of the uniselector 20, whereafter the relay 31 is energised to reduce the output voltage to the terminals 55, 56 and cause stepping of the uniselector 19. A circuit is now completed to the uniselector 38, which is stepped until the voltage at the terminals 55, 56 exceeds the output voltage of the bridge. At this stage the relay 32 is energised to reduce the output voltage to the terminals 55, 56, at which point operation of the apparatus ceases, and the positions of the movable contact pieces on the windings 52, 53, 54 indicate slightly less than the load applied to the bridge. Conveniently the relay 38 operates contacts (not shown) to close a circuit giving a visual indication of the load or for recording same.

The above description of operation assumes that the output voltage of the bridge will not be exactly equal to any combination of proportions of the windings 52, 53, 54. If the voltages are exactly equal when one of the banks 36ᵇ, 37ᵇ, 38ᵇ are stepped, the operation varies slightly.

When one of the uniselectors 36, 37, 38 is energised the capacitor 42 is charged. However, when the apparatus operates as described above, the timing is such that the capacitor 42 is never charged to a value sufficient to break down the transistor 34. The contact 33ᵇ discharges the capacitor 42 when the relay 33 is de-energised, so that the capacitor 42 does not cumulate charge.

Assuming that the voltage at the terminals 55, 56 is equal to the output voltage of the bridge upon stepping of the bank 36ᵇ, the the uniselector 19 will be energised, but the uniselector 20 will not be de-energised. The uniselector 36 is thus operated again, so that the voltage at the terminals 55, 56 exceeds the output voltage of the bridge by one unit of the winding 52. The uniselector 20ᵃ is now de-energised and is stepped. The relay 30 will now be energised to operate the contact 30ᵇ, so that the voltage at the terminals 55, 56 is equal to the output voltage of the bridge. The relay 33 is now re-energised, but since there is now no path to any of the uniselectors 36, 37, 38 none of the contacts 36ˣ, 37ˣ, 38ˣ opens, and the relay remains energised. There is thus sufficient time for the capacitor 42 to be charged to a value to operate the transistor 34 and thereby operate the relay 39, which is held on through the contact 39ᵃ. The relay 39 operates contacts in parallel with those operated by the relay 38 for giving the aforesaid visual indication or effecting the recording.

In order to re-set the apparatus, the switch 50 is closed either manually or automatically when the load has been noted or recorded. When the switch 50 is closed, the relay 23 is energised, and is held on through the contacts 49$^a$, 23$^b$. Assuming that the movable contact of the bank 38$^a$ is not on the zero contact piece the uniselector 38 is energised and is operated until the movable contact is stepped onto the zero contact piece. The uniselector 37 is then re-set, followed by the uniselectors 36, 20, 19. As soon as the uniselector 19 is re-set, the relay 49 is energised to open the contact 49$^a$ and de-energise the relay 23. Reweighing of the same load is prevented by a switch (not shown) which is opened automatically after each weighing.

Having thus described my invention what I claim as new and desire to secure by Letters Patent is:

Apparatus for measuring the output voltage of an A.C. bridge, comprising in combination a transformer the primary winding of which is connected in use to an A.C. voltage in phase with that supplied to the bridge, said transformer including a plurality of unequal secondary windings each divided into a plurality of equal parts, a uniselector including a plurality of contact pieces and a contact arm movable step by step over said contact pieces, means connecting said contact pieces with the parts of the largest of said secondary windings, a difference amplifier connected to the bridge and to said uniselector so as to receive the output voltage of the bridge and a proportion of the output voltage of the transformer, the difference amplifier producing an A.C. output the phase of which is dependent on which of the voltages applied to the difference amplifier is greater in amplitude, means for operating the uniselector to connect the parts of said largest windings step by step to said amplifier, a phase detector connected to the amplifier so as to produce a direct current output of polarity dependent upon the phase of the output from the amplifier, means operable when the polarity of the phase detector changes for stopping the uniselector and by-passing one part of said largest winding, and a control circuit for successively energising further uniselectors connected to said amplifier and associated with the other secondary windings respectively, and operating them in the same way as the first-mentioned uniselector, so that the final position of the uniselector arms indicates the output voltage from the bridge.

References Cited by the Examiner
UNITED STATES PATENTS 3,098,194    7/1963    Clemens   ---------- 323—66

WALTER L. CARLSON, *Primary Examiner*.

RUDOLPH V. ROLINEC, *Examiner*.

G. L. LETT, *Assistant Examiner*.